United States Patent
Webb et al.

(10) Patent No.: US 8,718,476 B2
(45) Date of Patent: May 6, 2014

(54) TUNABLE OPTICAL DISCRIMINATOR

(75) Inventors: Steven Webb, Gravesend (GB); David Winterburn, Romford (GB)

(73) Assignee: Xtera Communications, Inc., Allen, TX (US)

( * ) Notice: Subject to any disclaimer, the term of this patent is extended or adjusted under 35 U.S.C. 154(b) by 1196 days.

(21) Appl. No.: 12/038,077

(22) Filed: Feb. 27, 2008

(65) Prior Publication Data

US 2009/0214200 A1    Aug. 27, 2009

(51) Int. Cl.
*H04J 14/02* (2006.01)
*H04B 10/06* (2011.01)

(52) U.S. Cl.
USPC .............. 398/95; 398/196; 398/212; 398/213

(58) Field of Classification Search
USPC ........... 398/202, 208, 209, 212, 213, 214, 95, 398/196
See application file for complete search history.

(56) References Cited

U.S. PATENT DOCUMENTS

| | | | |
|---|---|---|---|
| 4,800,555 A | 1/1989 | Foschini | |
| 5,101,450 A | 3/1992 | Olshansky | |
| 5,373,385 A | 12/1994 | Darcie et al. | |
| 5,877,698 A | 3/1999 | Kusnier et al. | |
| 6,369,926 B1 | 4/2002 | Lyu et al. | |
| 6,396,605 B1* | 5/2002 | Heflinger et al. | 398/140 |
| 7,411,726 B2* | 8/2008 | Caplan | 359/325 |
| 7,522,845 B2* | 4/2009 | Lautenschlager | 398/196 |
| 2001/0050929 A1 | 12/2001 | Dietrich et al. | |
| 2003/0058509 A1* | 3/2003 | Webb et al. | 359/187 |
| 2003/0175037 A1 | 9/2003 | Kimmitt et al. | |
| 2005/0213966 A1* | 9/2005 | Chown et al. | 398/27 |
| 2005/0232182 A1 | 10/2005 | Shattil | |
| 2006/0133827 A1* | 6/2006 | Becouarn et al. | 398/213 |
| 2006/0200710 A1* | 9/2006 | Webb et al. | 714/704 |
| 2007/0216988 A1 | 9/2007 | Caplan | |
| 2008/0175602 A1* | 7/2008 | Mitani et al. | 398/202 |

FOREIGN PATENT DOCUMENTS

| | | |
|---|---|---|
| EP | 1703651 A1 | 9/2006 |
| GB | 2381399 A | 4/2003 |

OTHER PUBLICATIONS

International Searching Authority, International Search Report, mailed on Apr. 28, 2009 for International Application No. PCT/US2009/035401 filed on Feb. 27, 2009.
International Searching Authority, Written Opinion of the International Search Authority, mailed on Apr. 28, 2009 for International Application No. PCT/US2009/035401 filed on Feb. 27, 2009.
Intellectual Property Office, Combined Search and Examination Report, mailed on Oct. 30, 2008 for United Kingdom Patent Application No. 0815703.4 filed on Aug. 28, 2008.

* cited by examiner

*Primary Examiner* — Kenneth Vanderpuye
*Assistant Examiner* — Daniel Dobson
(74) *Attorney, Agent, or Firm* — Workman Nydegger

(57) ABSTRACT

There is provided a method and apparatus for tuning an optical discriminator to the carrier frequency of an optical signal to allow superior reception of said signal. The carrier frequency of the signal is dithered during a test phase in order to provide information that allows a subsequent tuning phase to optimise the reception of the optical signal, as measured by a signal quality metric. The tuning phase may comprise adjustment of one or both of the carrier frequency and the optical discriminator.

15 Claims, 3 Drawing Sheets

TUNABLE OPTICAL DISCRIMINATOR

FIELD OF THE INVENTION

The present invention relates to the control of optical discriminators. It finds particular utility in the control of discriminators in long haul optical communications systems.

BACKGROUND OF THE INVENTION

In optical communications systems data is imparted onto light by varying the intensity and/or phase of the light signal. In a simple example binary data may be signaled by emitting light of maximum intensity to represent a "1" and zero intensity to represent a "0". An optical format of this kind, where the data is represented by the amplitude of the signal, is known as amplitude shift keyed (ASK).

In addition to ASK formats, it is known to transmit over long haul optical communications using phase-shift keyed (PSK) formats. Examples of PSK formats include differential PSK (DPSK) and differential quadrature PSK (DQPSK). PSK formats impart information onto the optical signal by varying its phase (rather than its intensity).

Data transmitted optically is typically manipulated in electronic form at its destination. Optical receivers for use in optical communications systems are therefore capable of converting optical signals into electronic signals. This is a relatively simple process for ASK formats, where components such as photo-diodes) for example, positive intrinsic negative (PIN) diodes) can be used to generate a signal which is proportional to the intensity of the received light. However, such components are typically incapable of discriminating between the phase of incident signals, and so additional features are required to decode PSK formats.

In particular, optical discriminators (differential delay interferometers) are used to extract the information included in PSK signals. Discriminators of this type typically split an incoming PSK signal into two components, and apply a relative delay to one of these components before they are recombined. By setting the delay as an integer number of the time period for a data bit in the signal, an initial bit can be compared with a subsequent bit through the interference of the two when the components are combined. The overall amplitude of the signal will consequently represent the difference in phase between these two bits. Since the amplitude can be measured by conventional components, the difference between the two bits can then be inferred from the resultant signal.

Reception of DPSK data requires accurate relative wavelength tuning control between the transmit signal carrier wavelength and the receiver optical discriminator such that the two remain accurately locked to each other. It is not possible to fix the tuning point(s) since the practical inherent stability of the transmitter laser source and the receiver discriminator cannot be relied upon to maintain good performance.

It is known, and conventionally preferred, to keep the transmit laser wavelength nominally fixed and to lock the receiver discriminator by a feedback control loop that measures receiver performance. An example of such a device is shown in US patent application US 2006-133827, which is incorporated herein by reference. The device in this application uses a dither based control loop which adjust the temperature experienced by one of the separated components passing through the discriminator, thereby altering the relative delay experienced by the two components before they are combined. The electrically detected radio frequency (RF) peak voltage as measured at a receiver photodiode is measured for higher and lower temperatures, and the temperature of the discriminator is adjusted towards the temperature in which a higher peak voltage is measured. Eventually, the device reaches an equilibrium position where alteration of the temperature would be disadvantageous in either direction, and the discriminator may be considered tuned to the carrier frequency of the optical signal.

Although thermal control of the discriminator wavelength described above may lead to improved results, it has an inherent and usually long time constant. Furthermore, as the direction in which to tune the discriminator is also established by variation of the discriminator control temperature, the thermal time constant of the discriminator also limits the speed at which this can be done. The combination of a thermal time constant and the requirement of dithering, means control is cumbersome and slow.

Moreover, further difficulties occur in practice as discriminators usually incorporate a heater rather than a thermoelectric cooler (TEC), for component fabrication simplicity, and as a result the dithering process relies on temperature decay to set the upper dither rate (that is, the process is even slower than would be the case for a device that could be actively cooled).

It is also found that to achieve a dither amplitude that offers a satisfactory results, a significant varying heat flux is required. This can lead to premature component failure. This is compounded by the fact the heater has to run at an elevated temperature with respect to the ambient in order to produce a tuning reaction—the higher the temperature with respect to ambient the faster the temperature decay for dither, but also the more component stress. As well as limiting the effectiveness of these techniques in adjusting the discriminator during use, the slow control loop can also hinder start-up time from cold before satisfactory transmission can be achieved.

SUMMARY OF THE INVENTION

According to the first aspect of the present invention, there is provided an optical transmission system comprising:
an optical source for transmitting an optical signal at a carrier frequency;
an optical discriminator for receiving the optical signal, the optical discriminator having an output; and,
a controller adapted to dither the carrier frequency to obtain a relationship between a signal quality metric at the output and the carrier frequency, the controller being further adapted to tune the optical discriminator or the carrier frequency in dependence on the relationship.

The present invention uses variation of the optical carrier frequency to tune one or more components in an optical system. In particular, the performance of the discriminator may be improved without the need to test it at number of tuning points. In this way, the time-consuming alteration of the tuning position of the discriminator is limited to positive improvements in performance (if required at all) rather than being used for test purposes. Variation of the carrier frequency is faster and more efficient for this purpose than prior art techniques. Once the testing stage has been carried out by the dithering technique the components are then tuned so as to improve the quality metric.

In a preferred embodiment, the optical signal is differential phase shift keyed (DPSK). In another preferred embodiment, the optical signal is differential quadrature phase shift keyed (DQPSK). However, other data formats may used for optical signal.

The carrier signal and the discriminator may be tuned in a number of ways. In particular, preferred embodiments tune the discriminator by varying its operating temperature, and tune the carrier frequency by varying the operating temperature of the signal source.

Preferably, the carrier frequency is dithered by varying a current driving the optical source. The variation of the drive current of the optical source is relatively fast when compared with other techniques, such as temperature control. This allows the system to be tuned at a greater speed since the relationship between carrier frequency and output quality can be identified at much greater speed. As such, preferred embodiments first perform the dithering process for the carrier frequency by varying the current driving the source, before subsequently tuning the source by control of the temperature of the source. This ensures a relatively quick response during the dithering process while enabling stable control of the tuning of the source through temperature control.

The output quality may be bit error rate (BER) or any other known metric used to describe the quality of received data (for example Q value or peak RF voltage). Moreover, the output quality may be a combination of metrics according to any desired relationship.

The dithering and tuning of the components may occur on a one-off basis, for example during the set-up of the system. However, the controller is preferably adapted to dither the carrier frequency and tune the optical discriminator or the carrier frequency during operation of the optical transmission system. More preferably, the controller is adapted to continuously dither the carrier frequency and tune the optical discriminator or the carrier frequency during operation of the optical transmission system.

The optical signal source is preferably a laser. The laser is preferably a continuous wave laser.

The controller may be located either at the receiver or transmitter end of the optical system, or may be distributed between the two.

According to a second aspect of the present invention, there is provided a method for tuning components in an optical system, the method comprising:

transmitting an optical signal to an optical discriminator having an output, the optical signal having a carrier frequency;

dithering the carrier frequency to obtain a relationship between a signal quality metric at the output and the carrier frequency tuning the carrier frequency or the discriminator in dependence on the relationship.

According to a third aspect of the present invention, there is provided an optical transmitter, comprising:

an optical source for transmitting an optical signal at a carrier frequency to an optical discriminator having an output, and a controller adapted to dither the carrier frequency to obtain a relationship between a signal quality metric at the output and the carrier frequency, the controller being further adapted to tune the optical discriminator or the carrier frequency in dependence on the relationship.

According to a fourth aspect of the present invention, there is provided an optical receiver, comprising:

a discriminator having an output for receiving an optical signal having a carrier frequency, and a controller adapted to dither the carrier frequency to obtain a relationship between a signal quality metric at the output and the carrier frequency, the controller being further adapted to tune the optical discriminator or the carrier frequency in dependence on the relationship.

BRIEF DESCRIPTION OF THE DRAWINGS

Examples of the present invention will now be described in detail with reference to the accompanying drawings, in which.

DETAILED DESCRIPTION

Figure 1:
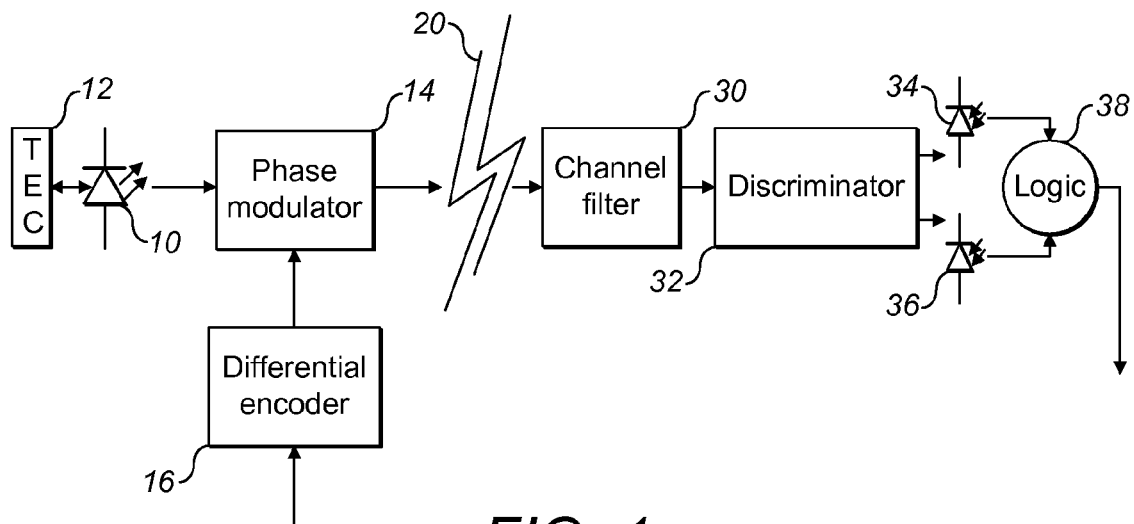
FIG. 1 illustrates the position of a discriminator in a transmission system that may be used in accordance with the present invention.

FIG. 1 shows the architecture of a typical transmission system incorporating a discriminator, such as may be adopted in the context of the present invention. The example shown in FIG. 1 is used for the transmission of differential phase shift keyed (DPSK) data, although other data formats may be used in the context of the present invention. In particular, other phase shift keyed formats (such as differential quadrature phase shift keyed (DQPSK)) may be adopted in accordance with the present invention.

A continuous wave laser source 10 emits a light signal having a carrier frequency. The laser source 10 is coupled to a thermoelectric cooler (TEC) 12 in order to regulate its temperature. Data is then modulated onto the source signal at a data frequency by a phase modulator 14 driven by a differential encoder 16. As mentioned above, the resulting data format is DPSK. The data modulated optical signal that results is simply binary modulated with data bits represented by 0 or 180 degrees phase. Preferably, an additional sinusoidal modulation (not shown in the Figure) is applied at the data frequency in order to produce a return to zero (RZ) signal. The resulting RZ-DPSK format has been found to be extremely favourable in long-haul transmission applications.

The data modulated signal then passes across a transmission system 20. This transmission network 20 may in practice be extremely large (for example in long-haul submarine optical communications tasks) and may contain a number of repeaters along the transmission path.

Although not shown, and not essential to the present invention, the modulated optical signal transferred across the transmission system is typically one of many in a wavelength division multiplexed (WDM) signal. A WDM signal contains a plurality of individual modulated signals each having a distinct carrier frequency. In this way, a plurality of data communications may be transmitted down a single transmission line simultaneously.

After passing through the transmission system 20 the signal is selected from those carried by the WDM signal by a channel filter 30. The filtered signal is then passed to a discriminator 32.

The discriminator 32 is typically a differential delay interferometer. In such devices, the signal is divided into two components, one of which is delayed relative to the other, and then recombined. A first output port 34 receives light in the case that the two components interfere constructively (that is, in the case where the two components are in phase), while a second output port 36 receives light when the two components interfere destructively (that is, in the case where the two components have opposite phase).

The output ports allow the representation of the data bits (which, as mentioned above are encoded in the phase of the signal transmitted over the transmission system) to be detected as amplitude modulation at photo diodes. This process is one of differential decoding which allows the data imparted by the differential encoder to be retrieved. Advantageously, the signals provided by the photodiodes may be subtracted from each other by a logic device (such as a differential amplifier) 38 to provide a BER performance benefit in terms of optical signal to noise ratio (OSNR) tolerance as compared with typical techniques employing amplitude shift keying (ASK).

Figure 2A:
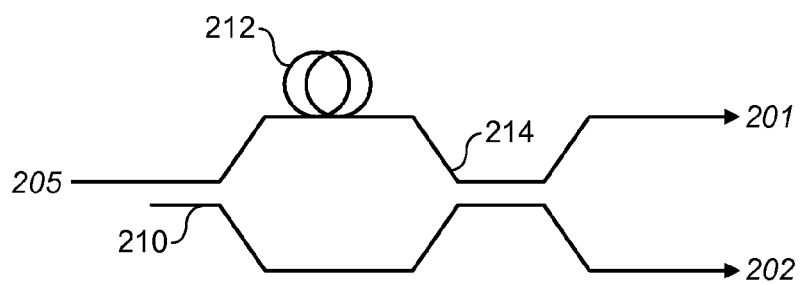
FIG. 2A is a schematic diagram of a discriminator based on a Mach Zehnder interferometer.
Figure 2B:
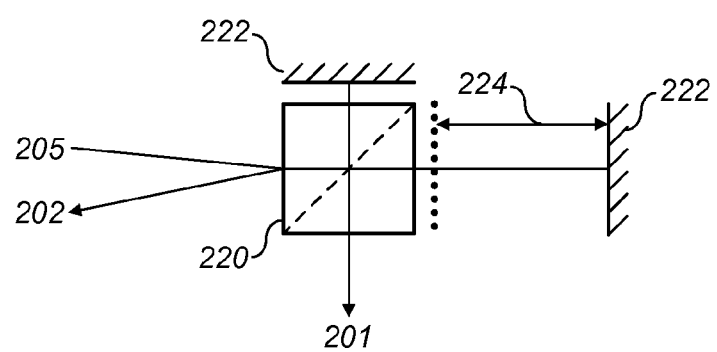
FIG. 2B is a schematic diagram of a discriminator based on a Michelson interferometer.

FIGS. 2A and 2B illustrate broadly the architecture of possible interferometers that may be used in the context of the present invention. FIG. 2A illustrates an interferometer of the Mach Zehnder (MZ) type, while FIG. 2B illustrates a Michelson interferometer. Each interferometer has a constructive port 201 through which light propagates when the separate components are recombined in phase, and a destructive port 202 through which light propagates when light is combined out of phase.

In the case of a MZ interferometer the incoming signal 205 is divided into two components by a 50/50 coupler 210 and the light in one of these components is subsequently delayed with respect to the other by a path length 212, before they are recombined by a combiner 214. The delay may be applied by increasing the physical distance through which the delayed component must travel with respect to the other component, but may also be slightly altered by increasing the refractive index of the waveguide through which the delayed component passes, thereby increasing the optical path length.

The Michelson delay interferometer shown in FIG. 2B divides the incoming signal 205 into two components through use of a half silvered mirror 220. The two components are then reflected by mirrors 222 before recombining at the half silvered mirror 220. Again, the path length of each component is different in order to ensure that one component is delayed with respect to the other.

Figure 3:
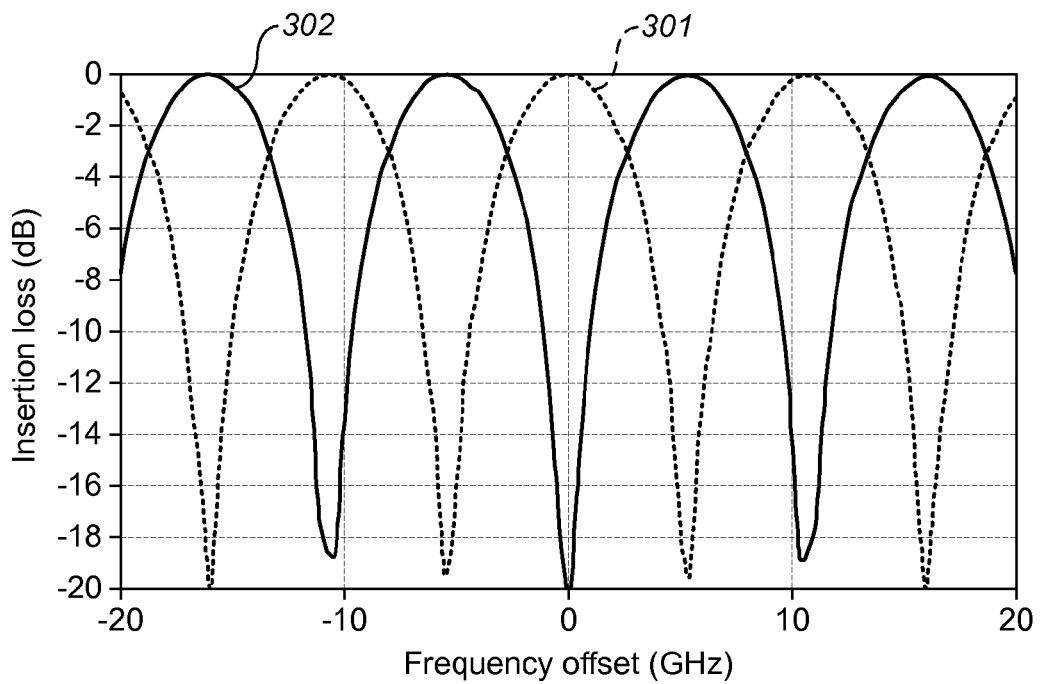
FIG. 3 illustrates the response curve of a discriminator relative to a wavelength offset.

In order to implement differential decoding of the transmitted signal, the delay between the two components in the interferometer is an integer multiple of the bit period. Preferably, the delay is chosen as one data bit period. For example, in a 10 Gb/s system, the delay would be 100 ps, which equates physically to about 2 cm in glass. This delay will set the free-spectral range, or repeat period, of the device in a spectral sense. FIG. 3 shows a typically example (in this case the demodulator is suitable for receiving a 10.709 Gb/s DPSK signal), illustrating the measured spectral response at the constructive 301 and destructive 302 ports as a function of wavelength. This would be measured with either tunable CW laser or a broadband noise source.

Optimal reception of the optical signal will occur when the discriminator's spectral response is correctly aligned to the transmitter signal. Typically the discriminator will be tunable by some mechanism in order to achieve this alignment. For example, the relative delay experienced by each component in the discriminator may be altered. In some preferred embodiments, the relative path length delay may be adjusted by an amount in the order of one carrier wavelength of the transmitted light. The adjustment of the delay may be achieved by physically altering the nature of the optical path traveled by one of the components. For example, the differential delay may be adjusted by temperature control of a glass waveguide in order to cause bulk expansion or contraction.

Alignment of the discriminator response with the transmitter wavelength may alternatively be achieved tuning the transmitter wavelength itself. Moreover, a combination of adjustment of the discriminator and the transmitter may be used to achieve the requisite tuning.

In practice, the tuning between the transmitter wavelength and discriminator response must be constantly updated to take account of changing conditions. A system that is set up at the optimum tuning initially will not retain suitable alignment over the lifetime of the system. Typical reasons for this include laser aging that requires more injection current to maintain a given output power, the increased current having the effect of increasing the refractive index in the laser's active region, which in turn leads to a lower lasing frequency. Thermal and environmental conditions can also affect both the laser and discriminator alignment. This will occur despite the fact that the laser is typically thermally stabilized using a TEC and thermistor feedback temperature measurement as it is physically difficult to measure the actual laser temperature accurately, leading to an error related to the distance between the thermistor chip and the laser itself. Thermal flux can also de-tune the discriminator if it is not coupled to the optical paths (or waveguides) of both components equally.

Figure 4:
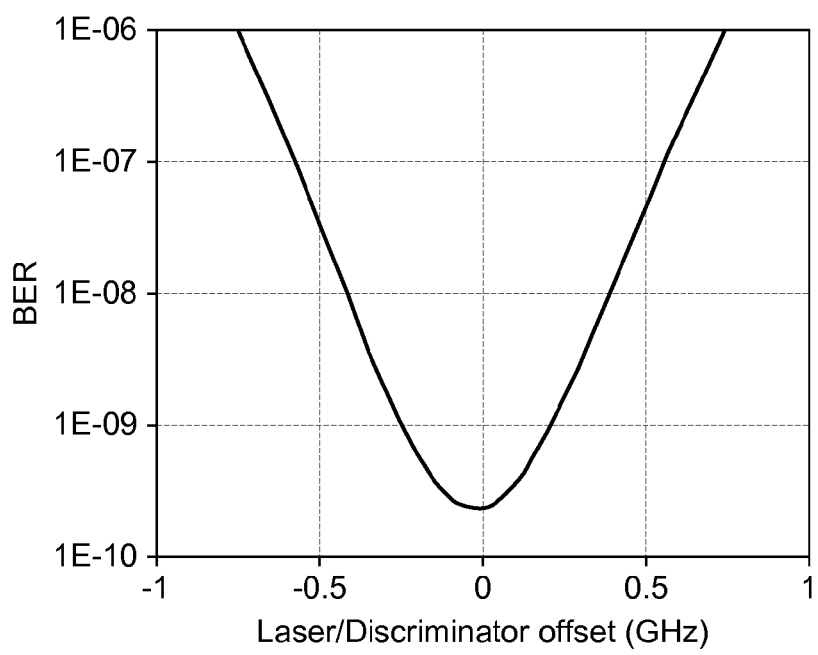
FIG. 4 illustrates the performance of a discriminator relative to a wavelength offset; and, FIG. 5 is a schematic diagram illustrating a feedback mechanism that may be adopted in accordance with the present invention.

FIG. 4 demonstrates the sensitivity of receiver performance to the tuning of the discriminator to the transmitter wavelength. In practice, it is found that, for a 10 Gb/s system, a 0.25 GHz delta drift between the transmit laser and the receiver discriminator may be accommodated without an unacceptable performance penalty in terms of bit error rate (BER).

In order to continuously align the discriminator and the transmitter (carrier) wavelength, the carrier wavelength is rapidly dithered in order to obtain performance information showing the relationship of a signal quality metric at the output of the discriminator (such as BER) and the carrier wavelength. That is, various carrier wavelengths are adopted in relatively quick succession and performance measures are taken at each of these wavelengths. The carrier wavelength and/or the discriminator settings can then be adjusted towards the value at which the best performance measure is achieved. The information obtained in this way allows the characteristics of the transmitter and the discriminator to be tuned effectively, without time consuming trial and error. In particular, there is no requirement to adjust the discriminator repeatedly and take measurements at each setting in order to ascertain to correct tuning of the discriminator.

Figure 5:
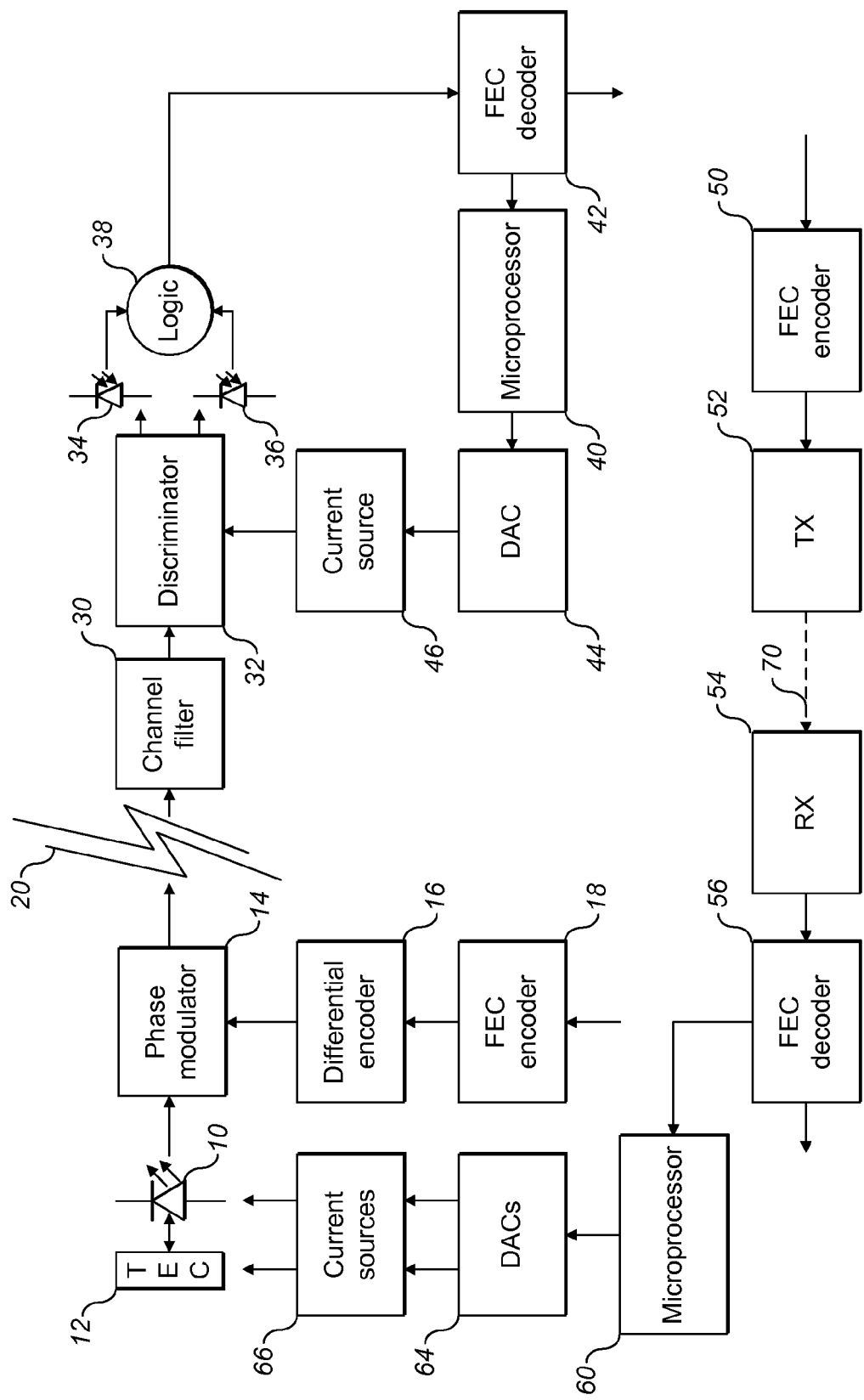

FIG. 5 shows an optical system that may be used in accordance with the present invention. The features depicted in FIG. 5 that are equivalent to those shown in FIG. 1 have the same reference numerals and perform the same functions.

A continuous wave (CW) signal laser 10 is powered by a current source 66 and normally also temperature stabilised in order to define its operating wavelength using a TEC 12. It is possible to adjust the lasing wavelength by changing the laser temperature (increasing the temperature gives a longer wavelength). However, the wavelength may be more quickly altered by changing the injection current (drive current) used to drive the laser. Increasing the injection current of the laser semiconductor medium and lengthens the lasing wavelength, while decreasing the drive current does the opposite. For a typical 1550 nm telecom laser this tuning is of order −1 GHz/mA, and the total drive current of order 100 mA. As such, an insignificant change in laser output power will be seen if it is dithered with 0.5 mA peak to peak. As noted in FIG. 4, a variation of +/−0.25 GHz would be appropriate for 10 Gb/s transmission, since it would not add a substantial performance penalty.

As illustrated, the control scheme for optimizing the alignment of the discriminator and the carrier wavelength is distributed between the transmitter and the receiver. As such, the transmitter works in co-operation with the non co-located receiver.

In the preferred embodiment shown in FIG. 5, the signals transmitted across the network 20 include forward error correction (FEC) imparted to the signal by a FEC encoder 18 coupled to the differential encoder 16. The signal then passes across the network to the discriminator 32. The outputs of the photodiodes at the constructive 34 and destructive ports 36 of the discriminator are subtracted and subsequently decoded by a forward error correction (FEC) decoder 42. This step produces measurements of bit error rate (BER) which are passed to a receiver microprocessor 40. The microprocessor 40 works in combination with a return transmitter 52 coupled to its own FEC encoder 50 for transmitting instruction messages across a return transmission line 70 to a secondary receiver 54 coupled to a further FEC decoder 56 where the instruction messages are retrieved. These instruction messages are passed to a transmitter microprocessor 60. The transmission microprocessor 60 then controls the drive current of the laser 10 and the current driving the TEC 12 coupled to the laser via a number of digital-to-analog converters (DACs) 64.

In the preferred embodiment described above, the control intelligence resides in the receive location (in the receiver microprocessor 40) and transmits command signals to the transmitter contained in the return transmission line's FEC overhead channel. Equally, the control intelligence may reside in the transmitter and receive the performance data from the receiver. However, this approach requires transmission of instructions for the discriminator to be tuned to be transmitted across the network. The control scheme is preferably predominantly implemented as a software algorithm due to the practical convenience and flexibility of this approach.

The transmitter contains circuitry that both adjusts laser injection current and also stabilises its operating temperature with current source connected through the laser's TEC. Typically these currents are defined by a micro-processor driving DACs 64 which in turn are connected to power semiconductors 66.

Commands from the far end receiver are communicated over the return transmission line, received by the FEC decoder 56 and executed to drive either the laser injection current or the laser temperature. The receiver microprocessor 40 implements a transmit laser dither cycle by sending appropriate commands at the correct times. In turn, the transmission performance is measured by methods of error detection from the FEC (alternatively or additionally, a RF peak detector rectifying the electrical signal from the receiver PIN may be used as a measure of transmission quality). Performance improvements would be deemed a reduced transmission BER (or increased RF peak voltage) in the case of RZ-DPSK (or RZ-DQPSK).

Optimisation of performance with respect to laser-discriminator wavelength offset may be achieved by tuning the discriminator heater control. This heat control is driven by a current source 46 controlled by the receiver microprocessor 40 via a DAC 44. Alternatively, and in some cases beneficially, performance can also be optimised by tuning the discrete laser temperature and leaving the discriminator fixed (this has certain benefits that will be discussed later).

A first control algorithm that may be used, in the case in which the discriminator is tuned, may take the following form:
Start Loop:
Increase TX laser current by 0.5 mA
Measure RX BER1
Decrease TX laser current by 0.5 mA
Measure RX BER2
If(BER2>BER1) Increase RX Discriminator Wavelength
If(BER1>BER2) Decrease RX Discriminator Wavelength
Repeat Loop:

An alternative algorithm, in the case where the discriminator is fixed and the laser wavelength is tuned, may take the following form:
Start Loop:
Increase TX laser current by 0.5 mA
Measure RX BER1
Decrease TX laser current by 0.5 mA
Measure RX BER2
If(BER2>BER1) Increase TX Laser Wavelength (i.e. increase temperature)
If(BER1>BER2) Decrease TX Laser Wavelength (i.e. decrease temperature
Repeat Loop:

In both of the above algorithms, the dithering of the transmitter wavelength for testing purposes is achieved by varying the drive current of the laser, while the subsequent tuning of the component (either laser or discriminator) is effected by temperature control. As such, the power of the laser once the system has been tuned is unaltered as compared with the initial state.

One skilled in the art will recognise that by tuning the laser while leaving the discriminator fixed (as in the second algorithm above), the carrier laser wavelength is effectively locked to the receiver discriminator using it as a wavelength reference, providing stability for the carrier wavelength.

In a WDM system where a plurality of separate laser signals (or channels) are transmitted at different frequencies across the network, each channel having a different carrier frequency, the use of one or more fixed discriminators may be used to set and maintain the frequency spacing of the channels. For example, a the free spectral range of the device when receiving 10 GB/s data coded with conventionally available FEC is 10.709 GHz. As such, the use of a single discriminator for all channels, or similarly specified discriminators for each channel, can be used to lock each channel of the system at a separation of 10.709 GHz (since the discriminator has a repeating characteristic). For example a set of 4 channels across 42.836 Ghz may be used. If it is desired to distribute the channels across alternative ranges (for instance, it is known to distribute channels across a fixed grid such as 50 GHz) then the discriminator for each channel may be specifically tuned to normalise its performance for a particular slot across the range.

It is found that the potential wavelength drift of the discriminator which is identified and addressed in the tuning algorithms above is not of such magnitude as to interfere with reliable channel spacing when using the discriminator to lock the wavelengths of the lasers. Discriminators having suitable characteristics for this purpose are available commercially, for example from Optoplex Corp, in either passive or semi-tunable form. A tunable discriminator that may be used with the present invention is described at: http://www.optoplex.com/pdf/DPSK_demodulator.pdf.

Fixed discriminator settings in 10 Gb/s may also be used in the context of three channel systems across 3×10.709=32.127 GHz, and two channel systems across 2×10.709=21.418

GHz. This latter approach may find particular utility in the systems adopting DQPSK, given the additional spectral efficiency of this format.

In addition to offering benefits in terms of the control of channel spacing, fixed discriminator settings allow simpler construction leading to reduced cost.

In embodiments using a tunable discriminator, it may be found that the discriminator is only tunable across a set range. For example, the temperature of the discriminator may be limited to within certain limits. As such, it is desirable that the algorithm controlling the tuning of the discriminator to the wavelength of the laser does not force the discriminator beyond these limits.

Preferred embodiments of the present invention address the above-mentioned problem by adjusting the wavelength of the laser in addition to the tuning of the discriminator in order to ensure that the discriminator remains within acceptable limits. For example, in addition to a step of tuning the discriminator a step of adjusting the wavelength is incorporated, wherein the step of adjusting the wavelength depends on the relative position of the tuning of the discriminator within the available range. An exemplary algorithm of this type is given below:

Start Loop:
Increase TX laser current by 0.5 mA
Measure RX BER1
Decrease TX laser current by 0.5 mA
Measure RX BER2
If(BER2>BER1) Increase RX Discriminator Wavelength
If(BER1>BER2) Decrease RX Discriminator Wavelength
If(Discriminator Wavelength>MID wavelength)
Decrease Laser Wavelength (i.e. decrease temperature)
If(Discriminator Wavelength<MID wavelength)
Increase Laser Wavelength (i.e. increase temperature)
Repeat Loop:

As can be seen the discriminator is first tuned to the laser wavelength in dependence on results obtained by dithering the laser wavelength, and the laser wavelength is then adjusted to bring it towards the centre of the range over which the discriminator may be tuned. In this example, the initial dithering of the laser wavelength is achieved by varying the drive current, while the later adjustment of the laser wavelength is achieved by altering the laser temperature. This is appropriate because varying the drive current has a direct effect on optical output power of the laser, but is achievable at the relative fast rate required to dither the laser without delay, while the slower time constant of varying the laser temperature is not disadvantageous for the permanent adjustment used to bring the wavelength towards the centre of the acceptable range for the discriminator.

The result of the technique outlined above is that the laser wavelength remains locked to the discriminator as required for good reception and the discriminator is held at its mid wavelength range for good control authority. This leads to a robust and reliable control solution with benefits that channel spacing is adequately maintained by broad discriminator stability and fast control authority is governed by the laser dither control loop. In addition arbitrary channel spacing may be achieved with no pre-fixation of the discriminator component specification.

What is claimed is:

1. An optical transmission system comprising:
   an optical source for transmitting an optical signal at a carrier frequency, wherein the optical source is driven by a drive current, and wherein the carrier frequency is varied based on the amplitude of the drive current;
   an encoder providing data to be modulated onto the optical signal;
   a phase modulator for receiving the data provided by the encoder, and modulating the data onto the optical signal using a phase shift keyed format to generate a phase shift keyed optical signal;
   an optical discriminator for receiving the phase shift keyed optical signal, the optical discriminator having an output, wherein the optical discriminator is variable based on temperature; and,
   a controller adapted to dither the carrier frequency of the optical signal and the phase shift keyed optical signal by varying the amplitude of the drive current to cause the optical signal to have multiple carrier frequencies in sequence during operation of the transmission system, the controller further adapted to obtain relationships between a bit error rate of the received optical signal and each of the multiple carrier frequencies, the controller being further adapted to tune the optical discriminator or the carrier frequency in dependence on the relationships by adjusting the temperature of the optical discriminator or the optical source.

2. A system according to claim 1, wherein the phase shift keyed format is differential phase shift keyed (DPSK).

3. A system according to claim 2, wherein the phase shift keyed format is differential quadrature phase shift keyed (DQPSK).

4. A system according to claim 1, wherein the controller is adapted to continuously dither the carrier frequency and tune the optical discriminator or the optical source during operation of the optical transmission system.

5. A system according to claim 1, wherein the controller is adapted to adjust the carrier frequency in dependence on the position of the tuning of the discriminator within an available range.

6. A system according to claim 1, wherein the optical signal is one of a plurality of signals within a wavelength division multiplexed (WDM) signal.

7. A system according to claim 6, comprising a plurality of discriminators, each discriminator adapted to receive one or more of the signals within the WDM signal.

8. A system according to claim 7, wherein the plurality of optical discriminators impart the same characteristic differential delay to the signal.

9. A method for tuning components in an optical system, the method comprising:
   transmitting an optical signal to an optical discriminator having an output, the optical signal having a carrier frequency that varies based on the amplitude of a drive current, wherein the optical discriminator is variable based on temperature, the optical signal further having data encoded thereon in a phase shift keyed format to generate a phase shift keyed signal;
   dithering the carrier frequency of the optical signal and the phase shift keyed optical signal by varying the amplitude of the drive current to cause the optical signal to have multiple carrier frequencies in sequence during operation of the transmission system, a controller adapted to obtain relationships between a bit error rate of the received optical signal and each of the multiple carrier frequencies;
   tuning the optical discriminator or the carrier frequency in dependence on the relationships by adjusting the temperature of the optical discriminator or a source of the optical signal.

10. A method according to claim 9, wherein the phase shift keyed format is differential phase shift keyed (DPSK).

11. A method according to claim 10, wherein the phase shift keyed format is differential quadrature phase shift keyed (DQPSK).

12. An optical transmitter, comprising:
- an optical source for transmitting an optical signal at a carrier frequency to an optical discriminator having an output, wherein the optical source is driven by a drive current, and wherein the carrier frequency is varied based on the amplitude of the drive current;
- an encoder providing data to be modulated onto the optical signal;
- a phase modulator for receiving the data provided by the encoder, and modulating the data onto the optical signal using a phase shift keyed format to generate a phase shift keyed optical signal; and
- a controller adapted to dither the carrier frequency of the optical signal and the phase shift keyed optical signal by varying the amplitude of the drive current to cause the optical signal to have multiple carrier frequencies in sequence during operation of the transmission system, the controller further adapted to obtain relationships between a bit error rate of the received optical signal and each of the multiple carrier frequencies, the controller being further adapted to tune the optical discriminator or the carrier frequency in dependence on the relationships by adjusting the temperature of the optical discriminator or the optical source.

13. An optical receiver, comprising:
- an optical discriminator for receiving an optical signal having a carrier frequency, wherein the carrier frequency is variable based on the amplitude of a drive current that drives a source of the optical signal, the optical signal further having data encoded thereon in a phase shift keyed format to generate a phase shift keyed signal; and
- a controller adapted to dither the carrier frequency of the optical signal and the phase shift keyed optical signal by varying the amplitude of the drive current to cause the optical signal to have multiple carrier frequencies in sequence during operation of the transmission system, the controller further adapted to obtain relationships between a bit error rate of the received optical signal and each of the multiple carrier frequencies, the controller being further adapted to tune the optical discriminator or the carrier frequency in dependence on the relationships by adjusting the temperature of the optical discriminator or the optical source.

14. A transmission system according to claim 1, wherein the phase shift keyed optical system in transmitted over a long haul optical system between the optical source and the optical discriminator.

15. A transmission system according to claim 1, wherein the controller is adapted to tune the optical discriminator by adjusting the temperature of the optical discriminator or the optical source.

* * * * *